Dec. 8, 1970  W. J. DAY  3,545,168

SEALING OF TUBES OF PLASTIC MATERIAL

Filed Oct. 30, 1967  3 Sheets-Sheet 1

Inventor
William John Day
By
Attorneys

Dec. 8, 1970 W. J. DAY 3,545,168
SEALING OF TUBES OF PLASTIC MATERIAL
Filed Oct. 30, 1967 3 Sheets-Sheet 2

Dec. 8, 1970      W. J. DAY      3,545,168

SEALING OF TUBES OF PLASTIC MATERIAL

Filed Oct. 30, 1967      3 Sheets-Sheet 3

Inventor
William John Day
By
Attorneys

# United States Patent Office 3,545,168
Patented Dec. 8, 1970

3,545,168
SEALING OF TUBES OF PLASTIC MATERIAL
William John Day, Gosport, England, assignor to E. S. Perry Limited, Gosport, England, a British company
Filed Oct. 30, 1967, Ser. No. 682,705
Int. Cl. B65b 3/04
U.S. Cl. 53—37
4 Claims

ABSTRACT OF THE DISCLOSURE

In sealing the end of a tube of heat sealable plastic material the tube is first inserted in a die so as to be freely slidable therethrough. It is thereafter brought into contact with or adjacent to a heater so that the end to be sealed is softened into a pliable state. The softened end is then withdrawn into the die by moving either the die or the tube. Thereafter the end is sealed by the application of a forming tool to the softened end while it is still within the die.

DESCRIPTION OF INVENTION

This invention is concerned with the sealing of the end of a tube of heat sealable plastics material and has application, for example, in the manufacture of ink cartridges of the kind employed as refills in certain types of fountain pen.

In sealing an end of a tube of heat sealable plastics material according to the invention the tube is first inserted in a die so as to be freely slidable therethrough, is thereafter brought into contact with or adjacent to a heater so that the end to be sealed is softened into a pliable state and the softened end withdrawn into the die and finally the end is sealed by the application of a forming punch to the softened end while it is still within the die.

Conveniently, when only one end has to be sealed, the tube can be carried on a mandrel so that movement of the tube through the die can be effected by movement of the mandrel. The method can still be employed satisfactorily however, when no mandrel is employed and has been found quite successful, for example, in closing the ends of a tube which have been already charged with ink or closing the ends of tubes formed by injection moulding and which have one end already closed.

Preferably the die is tapered or at least is mouthed so that any outwardly splayed material in the softened end of the tube is gradually forced inwardly as the tube is withdrawn into the die.

The time of heating and the temperature, will of course, vary according to the material of the tube and its dimensions. We have found however, that, with most common heat sealable plastics materials such as polyvinyl chloride and polythene and tubes of the size normally employed for ink cartridges a period of about 10 seconds is sufficient if the temperature is about 600° C.

So that the invention will be more readily understood it will be further explained by way of example with reference to the accompanying drawings in which.

Figure 1:
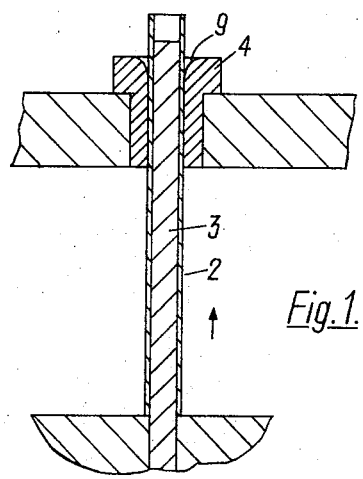
FIGS. 1, 2 and 3 show diagrammatically the various stages in carrying out the invention.
Figure 2:
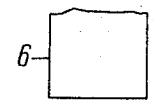
Figure 2:
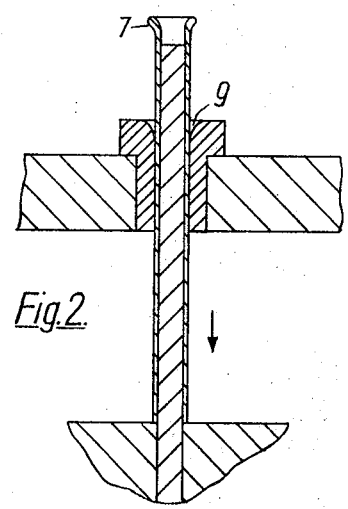
Figure 3:
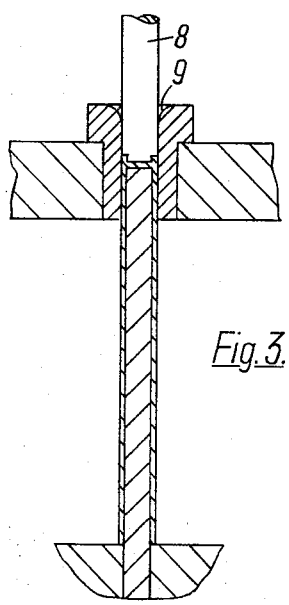

Referring to the drawings FIGS. 1–3 show by way of example three stages in the closing of the end of a polythene tube to be employed as an ink cartridge. In FIG. 1 the tube 2 is impaled on a steel mandrel 3 and is inserted in a hollow metal die 4. From this position the tube is carried by the mandrel through the die and into contact with or adjacent to a heater 6 (FIG. 2) where its end is softened to a pliable state. As shown in FIG. 2 the tube has been withdrawn from the heater bar and is being moved downwardly to bring the softened and expanded end 7 into the die 4. Withdrawal of the softened end through the bell mouthed part 9 causes a closing-in of the expanded part. With the softened end within the die (as in FIG. 3) a forming punch 8 is immediately inserted into the die to press on to the pliable plastics material, thereby squeezing the plastics material into a seal. The sealed tube is thereafter withdrawn from the die.

The form of the end of the punch can be varied. Thus the end can be flat or, as shown in FIG. 3, the end can be designed so as to form a thin readily puncturable membrane on the end of the tube. Of course the whole operation can be performed automatically or semi-automatically. Thus for example, a number of tubes can be mounted side by side in mandrels in a holder which slides between a sealing position and a heating position and an indicator such as a bell or buzzer can be so arranged that when sufficient heating has taken place a warning is given.

In fully automatic apparatus the tubes can be mounted in groups on a movable holder which is movable between a loading position, a heating position and a sealing position and a timing mechanism of any convenient type can be employed which causes the holder to be automatically moved from one position to another and also causes the tubes to be automatically operated on in these positions.

Figure 4:
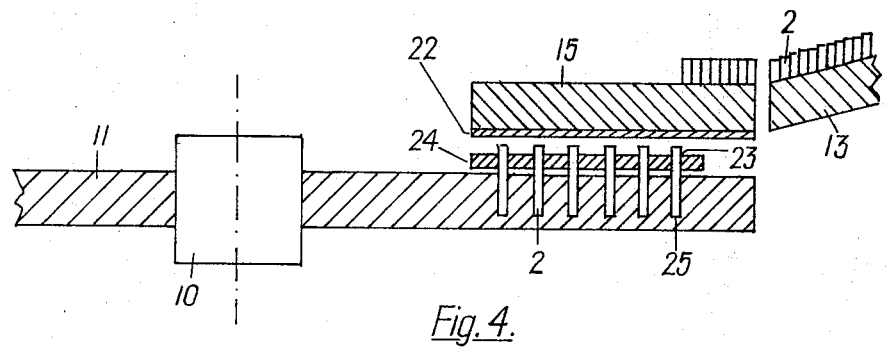
FIG. 4 shows diagrammatically part of an apparatus for carrying out the invention.
Figure 5:
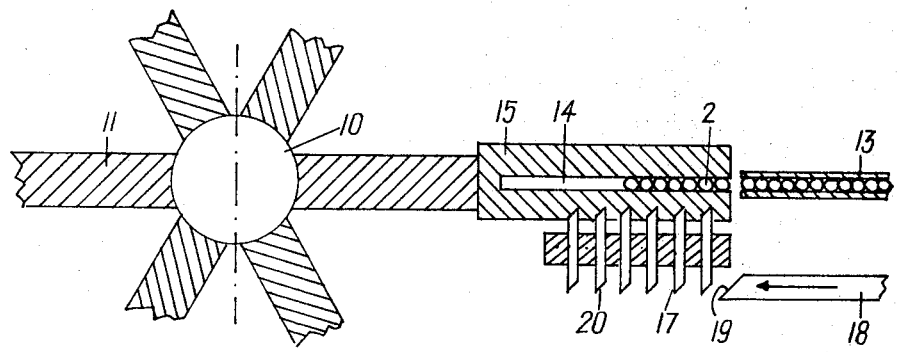
FIG. 5 is a plan of the apparatus shown in FIG. 4.
Figure 6:
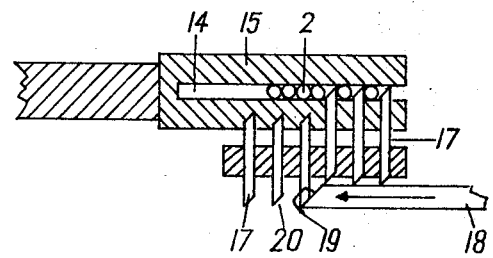
FIG. 6 shows a part of the apparatus of FIG. 5.

A typical apparatus for carrying out the invention automatically is shown in FIGS. 4–10. Referring first to FIGS. 4, 5 and 6 a rotatable capstan 10 has radiating arms 11 each adapted to carry a number, say six, of tubes 2 to be sealed. The capstan is arranged to be rotated in steps to carry the tubes from the charging position which is shown in FIG. 4 through successive processing stages which include heating and sealing. Successive steps could, for example, include the insertion into the tube of the ball that is conventionally included in many ink cartridges and the filling of the tube with ink.

The tubes 2 are fed down a chute 13 into a slot 14 in a spacer housing 15. At this stage the tubes 2 are closely adjacent to each other and need to be separated. To effect this separation sliding members 17 are moved forward in succession to engage between the tubes thereby spacing them. Successive operation of the member 17 is effected by means of a reciprocating bar 18 having a mitred end 19 which engages a corresponding mitred end 20 at the rear end of the sliding member 17 as it moves from right to left as shown in the drawing. Thus the first member 17 engaged by bar 18 in its forward stroke moved forward and engages between the sixth and seventh tubes fed into the slot 14 thereby selecting six tubes and moving them along slot 14 in the same direction as bar 18 is moving. Similarly the second sliding member 17 moves forward and it is engaged by the mitred end 19 and engages between the fifth and sixth tubes of the selected six thereby moving the five tubes in a leftward direction (as shown in the drawing) and at the same time correctly spacing the fifth and sixth tubes. As each successive sliding member moves forward it therefore correctly spaces two tubes and moves the remainder of the tubes leftward.

It is sometimes found convenient to arrange for the tip of the sliding member 17 which engages between the tubes to rotate slightly in the counterclockwise direction (as viewed in FIG. 5). This can be readily achieved by making the tip in the form of a finger which is pivoted in the sliding member and causing this finger to engage against a fixed stop as it moves forward which forces the finger to pivot against the force of a spring bending to return it to its initial position.

After all six tubes are spaced the bar 18 moves through a return stroke thereby allowing sliding members 17 to be returned by means of springs to their initial position as shown in FIG. 2. Thereafter the tubes 2 are allowed to fall from the bottom of the slot 14, for example, by moving away the base 22 of the housing 15, through apertures 23 in a die block 24 into bores 25 on the arm 11. The tubes therefore come to rest in the position corresponding to that shown in FIG. 1.

The die block 24, of which there is one carried with each capstan arm, is provided with inserts at dies 4 of the kind shown in FIGS. 1–3 and 9, each die being bell mouthed.

After spacing of the tubes the capstan rotates one step bringing a new arm 11 beneath the spacer housing to receive a further batch of tubes. While the already charged arm is moved on for the next operation.

Figure 7:
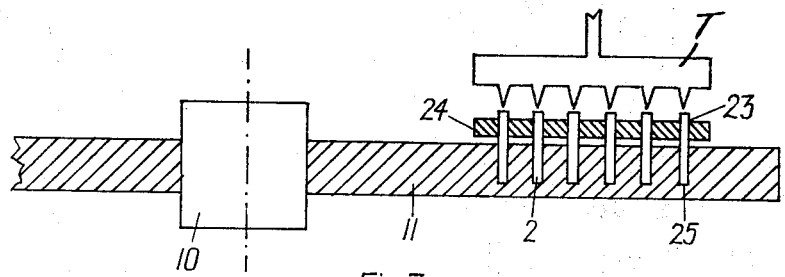
FIG. 7 shows diagrammatically the apparatus associated with a charging station.
Figure 8:
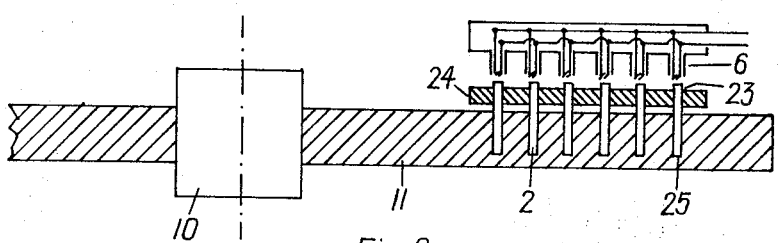
FIG. 8 shows diagrammatically the apparatus associated with a heating station.
Figure 9:
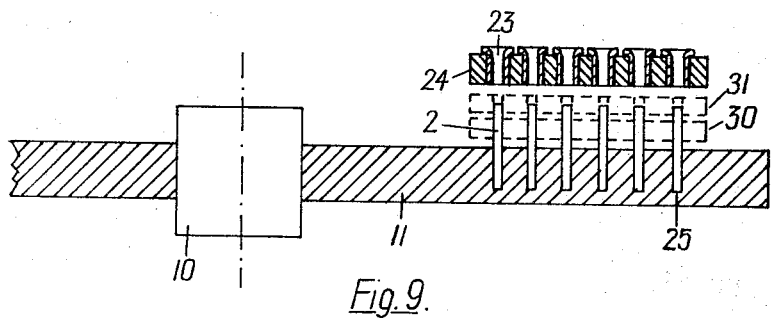
FIG. 9 shows diagrammatically the same apparatus as FIG. 4 but in another position.
Figure 10:
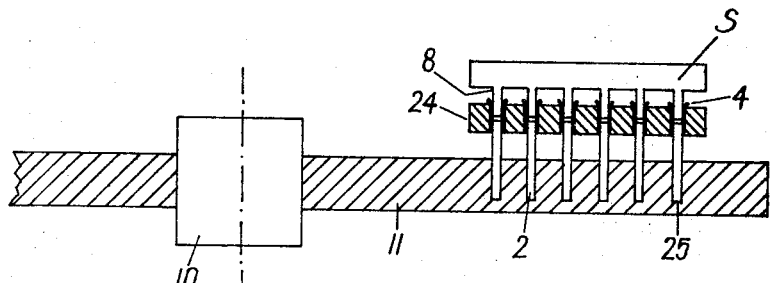
FIG. 10 shows diagrammatically the apparatus associated with a closing station.

At one of the stages the tubes, located in the die as shown in FIG. 4 or as shown in dotted lines at 30 in FIG. 7 is brought beneath the heater 6, where each tube is heated to render its end plastic or pliable. Thereafter the die-block 24 is moved upwardly to the position shown in dotted lines at 31 in FIG. 9, this corresponding to the tube position shown in FIG. 3. The capstan is again rotated to the next stage at which stage a forming punch at tool 8 is moved into each die to effect sealing of the tube. The tubes are then ready for discharge from the apparatus.

What is claimed is:

1. A method of making prefilled cartridges from tubular plastic material, which method comprises the step of loading one or more tubes which are closed at one end into a movable holder which holds the tubes in a substantially vertical position with the closed ends lowermost; inserting the upper ends of the tubes through a movable die movable with the holder and through which the tubes can slide; the step of moving the holder to a second position; charging the tubes in said second position with material; the step of further moving the holder to a third position extending the upper ends of the tubes in said third position above the die and heating said upper ends of the tubes to soften same into pliable state, and then engaging the tubes ends within the die; the step of moving the holder to a fourth position and closing the tube ends in said fourth position by the application of a forming tool to the softened ends of the tubes while those ends are still engaged within the die; and finally the step of moving the holder to a fifth position and discharging the prefilled cartridges therefrom.

2. A method according to claim 1 wherein the tubes are first introduced into a housing and are spaced therein prior to introduction to the holder by the insertion between neighboring tubes of fingers having a width corresponding to the desired spacing of the tubes when located in the holder, and wherein the spaced tubes are thereafter allowed to fall into position in the holder by moving the base of the housing.

3. Apparatus for making prefilled cartridges from plastic tubes which are initially closed at one end, which apparatus comprises a movable holding means having means for suporting one or more tubes in a substantially vertical position with the closed ends lowermost; means for moving the holder through successive operative positions; a die located above the holder and movable therewith and through which the tube can slide freely; means at one operative position of the holder for charging the tubes; a heater located above the holder at another operative position of the holder; means for bringing the tubes and heater into adjacent positions wherein the tube ends project from the die and are heated to a pliable state; means for withdrawing the pliable tube ends into the die; forming tool means located at another of the operative positions; means for applying the forming tools to the tube and while they are within the die to cause the closing of said ends; and means at another operative position for discharging the completed cartridges from the holder.

4. Apparatus according to claim 3 comprising housing means for receiving the tubes charged to the apparatus; means for spacing the tubes into relative locations corresponding to the desired tube spacing in the holder, said spacing means incorporating fingers insertable between adjacent tubes and of the width coresponding to the desired spacing; and means for removing the base of the housing whereby the spaced tubes fall from the housing into the holder.

References Cited
UNITED STATES PATENTS
2,449,478  9/1948  Herzog _____ 53—37
2,876,496  3/1959  Murphy _____ 264—322

THERON E. CONDON, Primary Examiner

R. L. SPRUILL, Assistant Examiner

U.S. Cl. X.R.
53—40, 266; 264—322